(12) United States Patent
Smith et al.

(10) Patent No.: US 8,209,243 B2
(45) Date of Patent: Jun. 26, 2012

(54) SYSTEM AND METHOD FOR REAL-TIME LABOR MANAGEMENT

(75) Inventors: Daniel Claude Smith, Salt Lake City, UT (US); Antonio Robert Grijalva, Jr., Spring, TX (US)

(73) Assignee: Hourdoc Holdings, LLC, Houston, TX (US)

( * ) Notice: Subject to any disclaimer, the term of this patent is extended or adjusted under 35 U.S.C. 154(b) by 299 days.

(21) Appl. No.: 12/554,412

(22) Filed: Sep. 4, 2009

(65) Prior Publication Data

US 2010/0063909 A1   Mar. 11, 2010

Related U.S. Application Data

(60) Provisional application No. 61/094,674, filed on Sep. 5, 2008.

(51) Int. Cl.
*G06F 15/02* (2006.01)
(52) U.S. Cl. .......... 705/32; 705/7.15; 702/148; 455/466
(58) Field of Classification Search .................. None
See application file for complete search history.

(56) References Cited

U.S. PATENT DOCUMENTS

| 7,277,717 | B1 | 10/2007 | Hart et al. | |
|---|---|---|---|---|
| 2002/0145559 | A1* | 10/2002 | Sullivan | 342/357.07 |
| 2005/0021428 | A1* | 1/2005 | Costello | 705/32 |
| 2007/0088638 | A1* | 4/2007 | Finch et al. | 705/32 |
| 2007/0232333 | A1* | 10/2007 | Xu | 455/466 |

FOREIGN PATENT DOCUMENTS

| JP | 2003-337967 | 11/2003 |
|---|---|---|
| KR | 10-2006-0026358 | 3/2006 |
| WO | 99/41707 | 8/1999 |

OTHER PUBLICATIONS

"Outsource or Not, Its Still a Matter of Time"; Prewett, Scott, Accounting Today, Nov. 2007, p. 21.*
Jung Jin Kim, International Search Report for International Patent Application No. PCT/US2009/056095, Korean Intellectual Property Office, Republic of Korea, dated Apr. 5, 2010.
Jung Jin Kim, Written Opinion for International Patent Application No. PCT/US2009/056095, Korean Intellectual Property Office, Republic of Korea, dated Apr. 5, 2010.
JumpStart Wireless, "Executive Summary", JumpStart Wireless Corporation, 2009.
Becamel, P., International Preliminary Report on Patentability for International Patent Application No. PCT/ US2009/056095, The International Bureau of WIPO, dated Mar. 8, 2011.

* cited by examiner

*Primary Examiner* — M. Thein
(74) *Attorney, Agent, or Firm* — Locke Lord LLP

(57) ABSTRACT

A system for performing real-time labor management and timesheet reporting comprising: a plurality of portable and dedicated time tracking units, with each unit operable to wirelessly transmit timesheet information; and a labor management system operable to receive the timesheet information from each of the time tracking units and thereby maintain the timesheet information for each time tracking unit. Each unit may be dedicated to tracking time and incapable of providing unrelated functions.

14 Claims, 4 Drawing Sheets

SYSTEM AND METHOD FOR REAL-TIME LABOR MANAGEMENT

CROSS REFERENCE TO RELATED APPLICATIONS

This application claims priority of U.S. Provisional Application Ser. No. 61/094,674, filed Sep. 5, 2008, which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosed embodiments relate generally to tools for tracking employee time and attendance and, more particularly, to systems and methods for real-time labor management and timesheet reporting.

2. Description of the Related Art

An important aspect of any business is tracking employee time and attendance, both for payroll purposes and also in order to efficiently allocate company resources. A number of commercially-available tools have been developed to facilitate this function, including Time Tracking Solutions from Hourdoc.com of Houston, Tex., USA. Hourdoc.com's Time Tracking Solutions is an advanced Web-based labor management system that allows users to manage their work schedule over the Internet. With Time Tracking Solutions, users may log on from any Web-capable computer and record, for example, days worked, clock-in time, clock-out time, breaks taken, vacations planned, and the like. Additional details concerning the various features and functionality of Hourdoc.com's Time Tracking Solutions may be obtained at http://www.hourdoc.com which is incorporated herein by specific reference.

U.S. Pat. No. 7,277,717 discloses a "dispatch communication and management system and method, preferably based on the SMS function of the GSM specification, allows a dispatcher and a remote service technician to exchange messages in a prescribed format to alternately enter event information into a customer service record."

U.S. Patent Application Publication No. 20070232333 discloses a "method and apparatus for collecting work related information from a mobile employee. A mobile employee sends a short message by simply pressing one key on his mobile phone, the system of the present invention collects the geographic, time, work status and employee information of the mobile employee. A mobile employee sends a short message to a mobile employee information collector. An SMS message receiver receives the short message and sends a geographic information query to a geographic information pager, and an employee information query to an employee information pager. A data processing unit receives the short message, the geographic information and employee information of the mobile employee and triggers a workflow in a data management system. The workflow could be used for keeping time record, managing inventory, assigning tasks, etc."

PCT International Publication No. WO 99/41707 discloses a "system and method for capturing and handling employment-related or time-related information from temporary or permanent employees utilizes a plurality of user terminals to capture timekeeping information. One or more user terminals are provided to employees for the entry of time spent working on one or more tasks. The user terminals can be portable, hand held data entry devices that allow the employees to key-in or otherwise enter their time worked for one or more employers or particular projects. The time entered can be reviewed by the employees prior to submission. Upon submission, the time entries can be reviewed by an appropriate party for correctness and checked for formatting or content errors. Once reviewed and checked, the approved entries can be forwarded to a processing system for assimilation."

BRIEF SUMMARY OF THE INVENTION

The present invention enhances existing labor management systems by providing users with the ability to access the labor management systems without requiring a Web-capable computer. The invention involves a portable electronic punch system (PEPS) that is capable of communicating with the labor management systems via text messages. Information contained in the text messages may then be processed by the labor management systems in essentially the same way as information that is manually inputted by a user over the Internet. In some embodiments, the invention also allows new user information to be added, or existing user information to be modified, by sending a text message with the information to the PEPS. Such an arrangement allows users to manage work schedules and report timesheet information without requiring a Web-capable computer.

In one embodiment, the invention includes a system for performing real-time labor management and timesheet reporting comprising: a plurality of portable and dedicated time tracking units, with each unit operable to wirelessly transmit timesheet information; and a labor management system operable to receive the timesheet information from each of the units and thereby maintain the timesheet information for each tracking unit. Each unit may be dedicated to tracking time and incapable of providing unrelated functions. Each unit may send text messages directly to the labor management system using a short message service protocol. The system may include a plurality of labor management systems, with each system being associated with a different company. The units may send the timesheet information directly to an appropriate one of the labor management systems. Alternatively, the system may include an intermediary receiver and each unit may wirelessly send the timesheet information to the intermediary receiver which forwards the timesheet information to an appropriate one of the labor management systems over a land-based connection. The timesheet information may include an employee ID, a clock-in time, and a clock-out time and is transmitted in the form of a text message using a short message service protocol. Each unit may be configured to resend the timesheet information a preset number of times if the labor management system is unavailable. Each unit may be configured to resend the timesheet information until a predetermined time period expires if the labor management system is unavailable. Each unit may be configured to be remotely setup by receiving a text message.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
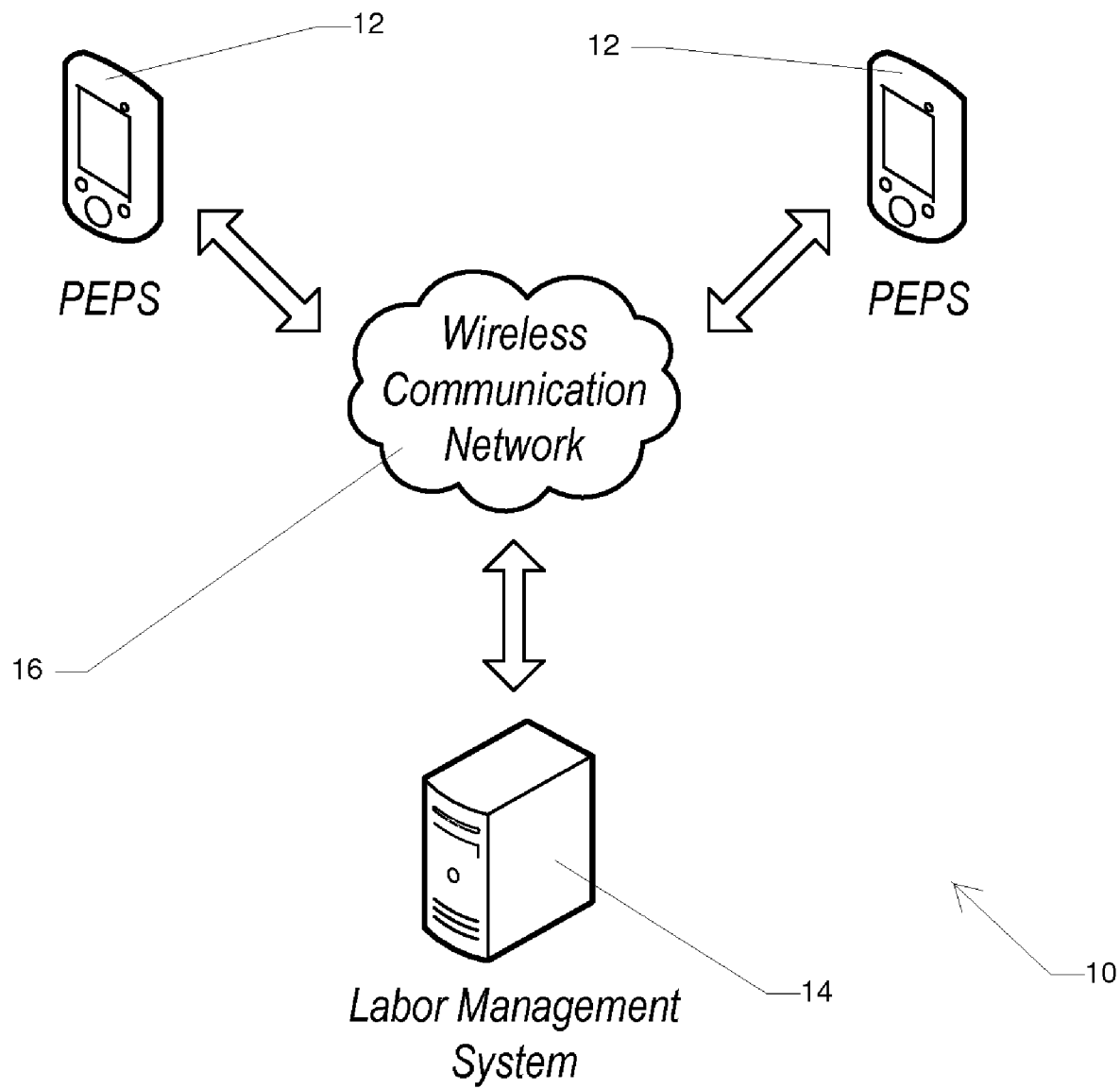
FIG. 1 illustrates an exemplary infrastructure for providing real-time labor management and reporting according to embodiments of the invention.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure 10 for providing real-time labor management and reporting is shown. The infrastructure 10 includes a plurality of portable electronic punch system (PEPS) units 12 that are capable of communicating with a centralized labor management system 14, such as Hourdoc.com's Time Tracking Solutions, and thereby providing timesheet or time tracking information. In accordance with embodiments of the invention, the communication between the PEPS units 12 and the labor management system 14 may be accomplished using text messages sent over a wireless communication network 16. Any suitable wireless communication network 16 may be used, including Global System for Mobile Communications (GSM), General Packet Radio Service (GPRS), Cellular Digital Packet Data (CDCP), Bluetooth, WiFi, and the like.

In some embodiments, the wireless text messages preferably conform to one or more predefined message formats that have designated data fields for holding specific items of timesheet information. The particular message formats, data fields, and/or information used may be customized as needed according to specific company preferences. Examples of information that may be contained in the messages may include employee ID, clock-in time, clock-out time, breaks times, days worked, days off, and other work-related information. The information in the text messages may then be processed by the labor management system 14 in essentially the same way as if the information had been manually entered by a user over the Internet. This allows the user to transmit his/her work schedule and timesheet information to the labor management system 14 virtually at any time and from any location without a Web-capable computer.

Once formatted, the text messages may be transmitted using any suitable text messaging protocol. Examples of text messaging protocols that may be used include short message service (SMS), instant messaging (IM), electronic messaging (e-mail), multimedia messaging services (MMS), and the like. Note that the term "text" is used herein to mean both letters and numbers, although one or the other may certainly be used exclusively if needed. Any standard text messaging interface known to those having ordinary skill in the art may then be installed at the labor management system 14 to receive the text messages. In some embodiments, if the labor management system 14 is unavailable, the PEPS unit 12 may attempt to re-send the text messages a preset number of times or until a predetermined time period expires.

Figure 2:
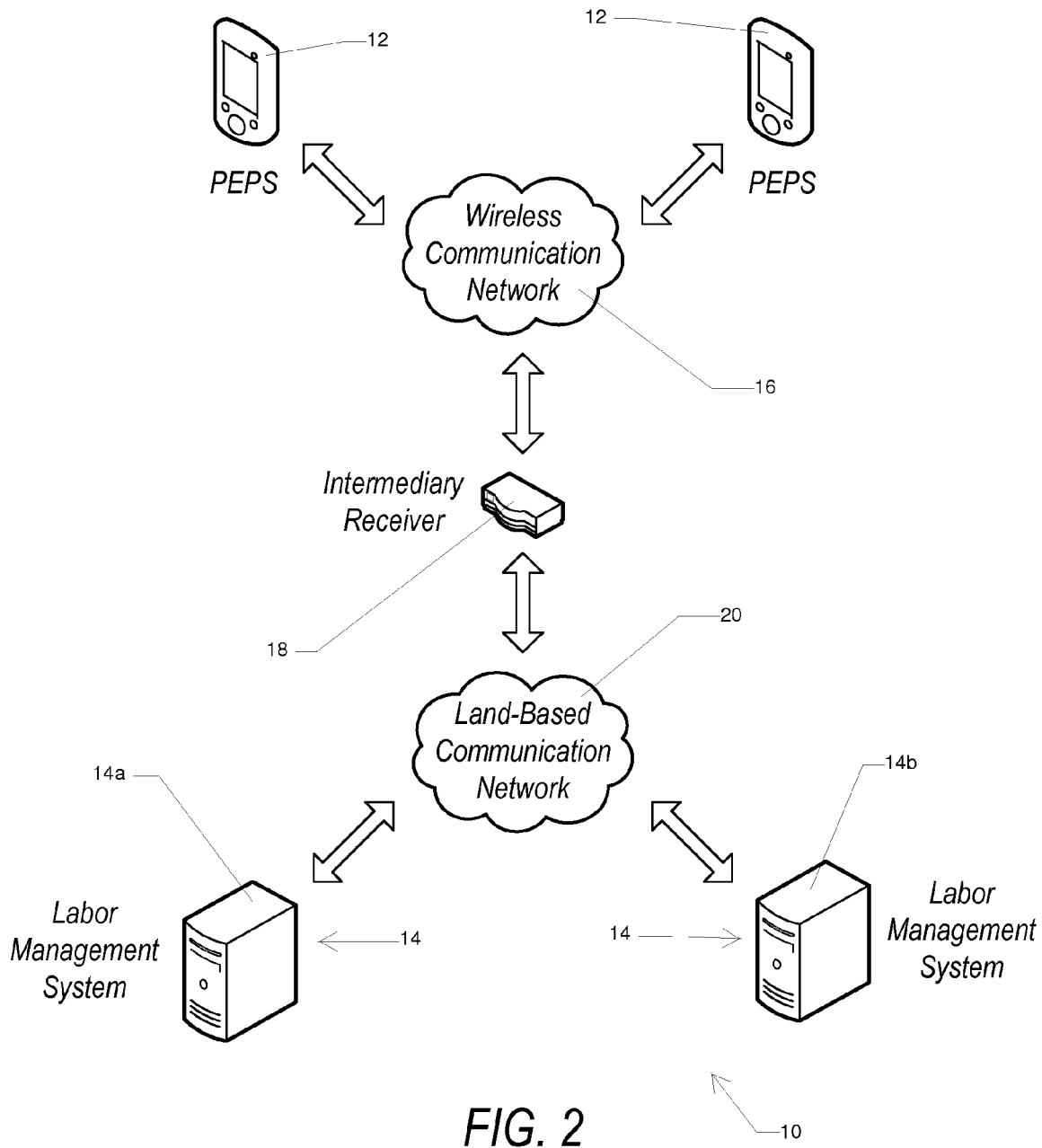
FIG. 2 illustrates another exemplary infrastructure for providing real-time labor management and reporting according to embodiments of the invention.

FIG. 2 illustrates an embodiment where, rather than sending the wireless text messages directly to the labor management system 14, the PEPS unit 12 may instead send the wireless text messages to an intermediary receiver 18. The intermediary receiver 18 may then forward the text messages to the labor management system 14 over land-based Internet connections 20 using, for example, FTP (file transfer protocol) or other suitable protocols. Such an arrangement allows one intermediary receiver 18 to serve as a centralized hub for multiple labor management systems 14a, 14b, effectively obviating the need (and cost) to equip each labor management system 14 with wireless communication capability. Users from different companies may then use the same intermediary receiver 18 to report their timesheet information to their respective companies' labor management systems 14a, 14b.

In some embodiments, a company code, employee code, a job and/or function code, a billing code, a cost code, a PEPS unit code, or other identifying information may be included in the text messages by the PEPS unit 12 to allow the intermediary receiver 18 to determine which text messages should be forwarded to which labor management system 14a,14b.

In some embodiments, in addition to sending information via wireless text messages, the PEPS unit 12 may also receive information via wireless text messages. For example, new users who are not set up yet to access or use the PEPS unit 12 may have their information (e.g., name, address, employee ID, etc.) sent in a wireless text message to the PEPS unit 12 by authorized personnel, such as a company manager. And as with the text messages sent from the PEPS unit 12, the text messages sent to the PEPS units 12 may also use one or more predefined formats with certain data fields containing specific information. Upon receiving the new user information, the PEPS unit 12 may create a profile for the new user to allow him/her to begin using the PEPS unit 12. Wireless text messages may also be sent to the PEPS unit 12 for purposes of updating or modifying existing user profiles as needed. Other types of information may also be sent to the PEPS unit 12 via wireless text messages without departing from the scope of the disclosed embodiments.

Figure 3:
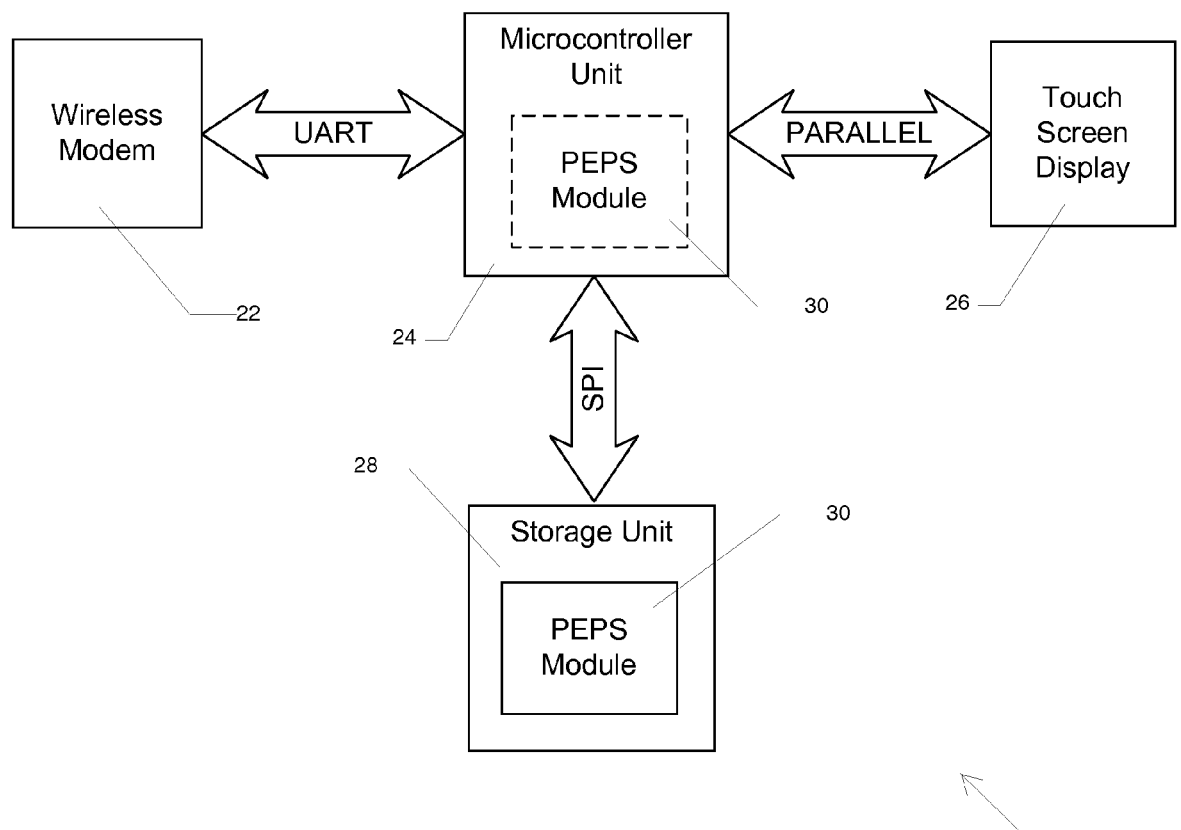
FIG. 3 illustrates an exemplary portable unit for providing real-time labor management and reporting according to embodiments of the invention.

FIG. 3 illustrates an exemplary implementation of the PEPS unit 12 in more detail according to some embodiments. As can be seen, the PEPS unit 12 may comprise a number of functional components, including a wireless modem 22, a microcontroller unit 24, a touch screen display 26, and a storage unit 28. Various serial and/or parallel communication interfaces may then be used to connect the different functional components to one another, including Universal Asynchronous Receiver Transmitter (UART), Serial Peripheral Interface (SPI), Universal Serial Bus (USB), and the like. A PEPS software module 30, or rather the computer-readable instructions therefor, may be stored in the storage unit 28 and executed by the microcontroller unit 24 to control the operation of the PEPS unit 12. Other functional components and software modules may be added to the PEPS unit 12 without departing from the scope of the invention. Each of these components is described in more detail below.

The wireless modem 22 may be operated to transmit and receive communication to and from the labor management system 14 and/or the intermediary receiver 18. To this end, the wireless modem 22 may be any suitable wireless modem known to those having ordinary skill in the art, including wireless modems that employ any of the wireless networking protocols mentioned above (e.g., GSM, GPRS, CDCP, Bluetooth, WiFi, etc.). Such a wireless modem may typically comprise an antenna, a power converter or other power supply, a SIM (Subscriber Identification Module) card that uniquely identifies the modem 22 to the wireless network 16, and the like. An example of a wireless modem 22 that may be used with the PEPS unit 12 is a GPRS MTCBA-G-F4 from Multi-Tech Systems of Mounds View, Minn. Similar wireless modems may then be installed at the labor management system 14 and/or the intermediary receiver 18 to allow these components to receive text messages from the PEPS unit 12.

The touch screen display 26 may be operated to display a graphical user interface that allows a user to control the PEPS unit 12. In some embodiments, the graphical user interface may include a keyboard that the user may touch to enter information into the PEPS unit 12. The keyboard may be a numeric keyboard or it may be an alphanumeric keyboard depending on the particular design of the PEPS unit 12. The user may then touch the keys on the keyboard to enter information into the PEPS unit 12 according to the graphical user interface. For example, the user may enter a user ID, a security code (e.g., password, PIN, etc.), clock-in time, clock-out time, and other timesheet information called for by the graphical user interface. Like the wireless modem 22 above, the touch screen display 26 may be any suitable touch screen display known to those having ordinary skill in the art. Preferably, the touch screen display 26 is an LCD (liquid crystal display) that has small dimensions and light weight so as to enhance the portability of the PEPS unit 12. A color display is also preferred over a grayscale display for aesthetic purposes.

The microcontroller unit 24 may be operated to, among other things, control the flow of data within the PEPS unit 12. More specifically, the microcontroller unit 24 may operate to regulate the timing of the data and how much data is sent to and from each of the wireless modem 22, touch screen display 26, and storage unit 28. The microcontroller 24 may perform this and other functions by executing the computer-readable instructions that constitute the PEPS software module 30. Such a microcontroller unit 24 may be a microprocessor, a digital signal processor (DSP), and application-specific integrated circuit (ASIC), programmable logic array (PLA) and the like, and may employ analog signals, digital signals, or mixed signals (i.e., analog and digital signals). Preferably the microcontroller unit 24 is a high speed, low power, and small size microcontroller unit in order to enhance the portability of the PEPS unit 12.

The storage unit 28 may be operated to store data, including user data, and computer-readable instructions, such as the PEPS software module 30, for the PEPS unit 12. To this end, the storage unit 28 may be any suitable computer-readable media, including magnetic, optical, or solid state media. Such computer-readable media may take the form of, for example, floppy disk, hard disk, magnetic tape, CD-ROM, DVD-ROM, RAM, PROM, EPROM, FLASH EPROM, and various variations thereof. As with the other components, the storage unit 28 is preferably high speed, low power, and small size in order to increase the portability of the PEPS unit 12.

Finally, the PEPS software module 30 may be executed to control the overall operation of the PEPS unit 12. The PEPS software module 30 may be written in the C programming language, which is a general purpose and procedural programming language. Among its many characteristics, the C programming language provides low-level access to memory components and requires minimal run-time support. Of course, those having ordinary skill in the art will understand that other programming languages may be used without departing from the scope of the invention.

In order to increase the portability and cost effectiveness of the PEPS units 12, they need not, and preferably do not, provide any other functionality. Such other functionality not provided may include, for example, cell phone calling functionality, e-mail sending/receiving functionality, Web browsing functionality, music and/or video playback functionality, GPS (Global Positioning System) functionality, general computing functionality, and the like. In other words, the PEPS units 12 may be dedicated units designed to exclusively provide the time tracking functions described herein. This inability to perform other functions, such as functions unrelated to time tracking, may also reduce the risk of misuse and/or theft of the PEPS units 12. Of course, in certain applications, the functionality of the PEPS units 12 may be incorporated into multi-function devices. Furthermore, the PEPS units 12 may use the text messaging capability to communicate regular text messages.

Figure 4:
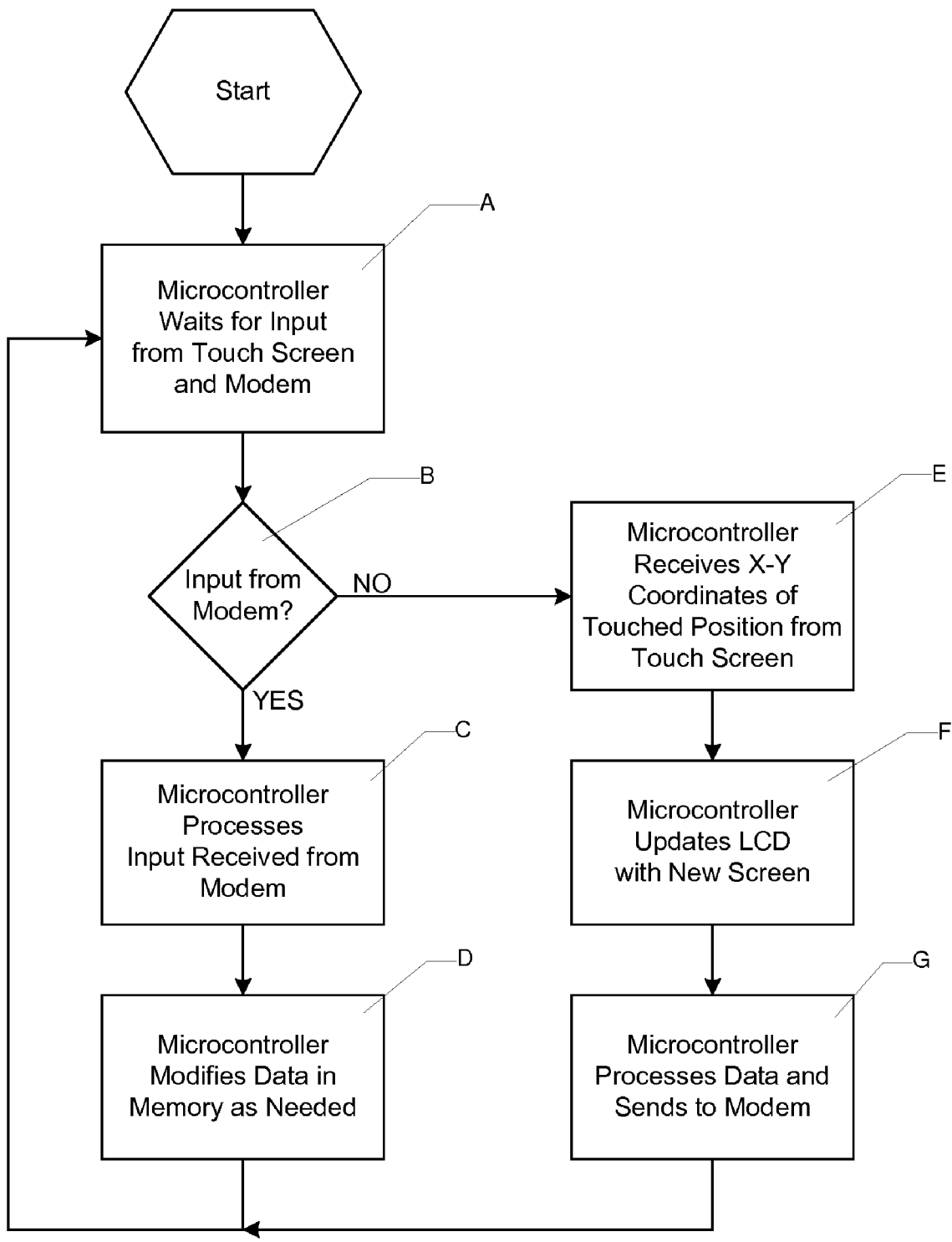
FIG. 4 illustrates an exemplary method for providing real-time labor management and reporting according to embodiments of the invention.

Operation of the PEPS software module 30 is illustrated FIG. 4 according to some embodiments. As can be seen in the high-level flowchart of FIG. 4, the PEPS software module 30 begins by causing the microcontroller unit 24 to wait for input from either the touch screen display 26 or the wireless modem 22, as shown in step A. Upon receiving data from either source, the PEPS software module 30 causes the microcontroller unit 24 to determine whether the data is received from the touch screen display 26 or the wireless modem 22, as shown in step B.

If the data is from the wireless modem 22, such as in the case of authorized personnel wishing to set up a new user profile in the PEPS unit 12, the PEPS software module 30 causes the microcontroller unit 24 to process the data and update the storage unit 28 accordingly with the data received from the wireless modem 22, as shown in steps C and D, respectively.

On the other hand, if the data is received from the touch screen display 26, meaning that it is entered by the user, the PEPS software module 30 causes the microcontroller unit 24 to translate the X-Y coordinates sent by the touch screen display 26 into data, refresh the display screen accordingly, and forward the data to the wireless modem 22 for transmission as a text message to the labor management system 14 and/or the intermediary receiver 18, as shown in steps E, F, and G, respectively. Such a text message may include employee ID, clock-in time, clock-out time, break time, days worked, days off, and the like. A simplistic example of a text message according to the disclosed embodiments may be: "11111|7/8/2008|10:52 AM|xxx|xxx|xxx|," where 11111 is the user ID, 7/8/2008 is the date, 10:52 AM is the time stamp, and xxx are various variables that may be used by the labor management system 14.

While the disclosed embodiments have one would been described with reference to one or more particular implementations, those skilled in the art will recognize that many changes may be made thereto. Therefore, each of the foregoing embodiments and obvious variations thereof is contemplated as falling within the spirit and scope of the disclosed embodiments.

What is claimed is:

1. A system for performing real-time labor management and timesheet reporting comprising:
   a plurality of portable and dedicated time tracking units, with each unit operable to wirelessly transmit text messages containing text information that is subsequently used to compose a timesheet; and
   a labor management system operable to receive the text messages containing the text information from each of the units and processing the text information locally to compose a timesheet for each unit using the text information, each timesheet being stored locally on the labor management system instead of each unit;
   wherein each of the units is configured to transmit the text messages containing the text information independently of the labor management system;
   wherein the units send the text messages directly to the labor management system using a short message service protocol; and
   wherein each unit is configured to resend the text information a preset number of times when the labor management system is unavailable.

2. The system as set forth in claim 1, wherein each unit is dedicated to tracking time and is incapable of providing unrelated functions.

3. The system as set forth in claim 1, wherein each unit is dedicated to transmitting text information and is incapable of transmitting non text information.

4. The system as set forth in claim 1, further including a plurality of labor management systems, with each system being associated with a different company.

5. The system as set forth in claim 4, wherein each unit sends the text information to an appropriate one of the labor management systems.

6. The system as set forth in claim 4, further including an intermediary receiver and wherein each unit wirelessly sends the text information to the intermediary receiver which forwards the text information to an appropriate one of the labor management systems over a land-based connection.

7. The system as set forth in claim 1, wherein the text information includes an employee ID, a clock-in time, and a clock-out time and is transmitted using a short message service protocol.

8. The system as set forth in claim 1, wherein each unit is configured to be remotely set up by receiving a text message.

9. A system for performing real-time labor management and timesheet reporting comprising:
   a plurality of labor management systems, with each system being associated with a different company and operable to receive text information and process the text information locally to compose timesheets for a plurality of employees using the text information, the timesheets being stored locally on the labor management systems;
   a plurality of portable and dedicated time tracking units, with each unit being associated with a different one of the employees and operable to wirelessly transmit the text information that is subsequently used to compose a timesheet for a respective employee; and
   an intermediary receiver operable to wirelessly receive the text information from the units, determine which labor management system is associated with each unit and forward the text information to an appropriate one of the labor management systems over a land-based connection;
   wherein each of the units is configured to transmit the text messages containing the text information independently of the labor management systems;
   wherein the units send the text messages directly to the labor management system using a short message service protocol; and
   wherein each unit is configured to resend the text information a preset number of times when the labor management system is unavailable.

10. The system as set forth in claim 9, wherein each unit is dedicated to tracking time and is incapable of providing unrelated functions.

11. The system as set forth in claim 9, wherein each unit is dedicated to transmitting text information and is incapable of transmitting non text information.

12. The system as set forth in claim 9, wherein the text information includes an employee ID, a clock-in time, and a clock-out time and is transmitted in the form of a text message using a short message service protocol.

13. The system as set forth in claim 9, wherein each unit is configured for remote set up by receiving a text message.

14. A method for performing real-time labor management and timesheet reporting comprising:
   receiving text information for a plurality of employees on a plurality of labor management systems, with each system being associated with a different company and configured to process the text information locally to compose timesheets for each company using the text information, the timesheets being stored locally on the labor management systems;

wirelessly transmitting the text information for the plurality of employees using a plurality of portable and dedicated time tracking units, with each unit being associated with a different one of the employees; and wirelessly receiving the text information from the plurality of time tracking units at an intermediary receiver, the intermediary receiver operable to determine which labor management system is associated with each unit and forward the text information to an appropriate one of the labor management systems over a land-based connection.

* * * * *